US009292358B2

(12) United States Patent
Kazan et al.

(10) Patent No.: US 9,292,358 B2
(45) Date of Patent: Mar. 22, 2016

(54) REMOTELY RETRIEVING INFORMATION FROM CONSUMER DEVICES

(75) Inventors: Wissam Kazan, Bellevue, WA (US); Marcin Przysucha, Redmond, WA (US); Aleksandra Kopczynska, Seattle, WA (US); Hemantha Ponnuru, Bellevue, WA (US); Gnana Kasturi Ganapathy, Bellevue, WA (US); Elizabeth Evans, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/158,457

(22) Filed: Jun. 13, 2011

(65) Prior Publication Data

US 2012/0317237 A1    Dec. 13, 2012

(51) Int. Cl.
G06F 15/16 (2006.01)
G06F 9/54 (2006.01)
H04L 29/08 (2006.01)

(52) U.S. Cl.
CPC .............. *G06F 9/54* (2013.01); *H04L 67/025* (2013.01); *G06F 2209/549* (2013.01)

(58) Field of Classification Search
CPC ..... H04L 29/0809–29/08099; G06F 2209/549
USPC ................................................. 709/204–206
See application file for complete search history.

(56) References Cited

U.S. PATENT DOCUMENTS

| 5,297,032 | A | 3/1994 | Trojan et al. |
|---|---|---|---|
| 5,321,750 | A | 6/1994 | Nadan |
| 5,339,392 | A | 8/1994 | Risberg et al. |
| 5,819,284 | A | 10/1998 | Farber et al. |
| 5,959,621 | A | 9/1999 | Nawaz et al. |
| 6,188,405 | B1 | 2/2001 | Czerwinski et al. |
| 6,216,141 | B1 | 4/2001 | Straub et al. |
| 6,278,448 | B1 | 8/2001 | Brown et al. |
| 6,311,058 | B1 | 10/2001 | Wecker et al. |
| 6,449,638 | B1 | 9/2002 | Wecker et al. |
| 6,456,334 | B1 | 9/2002 | Duhault |
| 6,480,880 | B2 * | 11/2002 | White et al. .................. 709/201 |

(Continued)

FOREIGN PATENT DOCUMENTS

WO    9926127 A1    5/1999

OTHER PUBLICATIONS

Soares, et al., "FEW Phone File System", Retrieved at <<http://inforum.org.pt/INForum2009/docs/full/paper_52.pdf>>, 2009, pp. 12.

(Continued)

*Primary Examiner* — Joshua Joo
(74) *Attorney, Agent, or Firm* — Bryan Webster; Doug Barker; Micky Minhas (57) ABSTRACT

Users that access their personal information from a home computer typically only need access to data, and do not need to remotely control the desktops of their home computers. By providing a remote access server that coordinates access to the file system of a user device, such as a home computer, a remote device, such as a mobile phone, can send commands to the user device. The remote device sends requests including commands to the server. The user device periodically requests these commands from the server. An application on the user device processes these commands, and in response provides the requested information to the server. The server responds to the requests from the remote device with the requested information from the user device.

24 Claims, 6 Drawing Sheets

(56) References Cited

U.S. PATENT DOCUMENTS

| | | |
|---|---|---|
| 6,510,553 B1 | 1/2003 | Hazra |
| 6,724,403 B1 | 4/2004 | Santoro et al. |
| 6,832,355 B1 | 12/2004 | Duperrouzel et al. |
| 6,976,210 B1 | 12/2005 | Silva et al. |
| 7,028,264 B2 | 4/2006 | Santoro et al. |
| 7,376,907 B2 | 5/2008 | Santoro et al. |
| 7,509,349 B2 | 3/2009 | Celik |
| 7,933,632 B2 | 4/2011 | Flynt et al. |
| 7,987,431 B2 | 7/2011 | Santoro et al. |
| 2001/0052006 A1* | 12/2001 | Barker et al. ............... 709/223 |
| 2003/0084128 A1 | 5/2003 | Anderson et al. |
| 2005/0003834 A1 | 1/2005 | Hughes |
| 2005/0113079 A1 | 5/2005 | Guo |
| 2005/0240773 A1 | 10/2005 | Hilbert et al. |
| 2006/0129632 A1 | 6/2006 | Blume et al. |
| 2006/0173974 A1 | 8/2006 | Tang |
| 2006/0190833 A1 | 8/2006 | SanGiovanni et al. |
| 2007/0097951 A1* | 5/2007 | Hilt et al. ..................... 370/351 |
| 2007/0162753 A1 | 7/2007 | Nakano et al. |
| 2008/0005432 A1* | 1/2008 | Kagawa ............... G06F 13/102 710/106 |
| 2008/0096603 A1 | 4/2008 | Sparre |
| 2008/0184123 A1* | 7/2008 | Shuqair et al. ................ 715/733 |
| 2008/0218309 A1* | 9/2008 | Steenstra et al. .............. 340/5.8 |
| 2008/0235400 A1 | 9/2008 | Slocombe et al. |
| 2008/0301239 A1* | 12/2008 | Khijniak et al. .............. 709/206 |
| 2009/0024687 A1* | 1/2009 | Quigley et al. ............... 709/201 |
| 2009/0077184 A1* | 3/2009 | Brewer ................ H04L 67/125 709/206 |
| 2010/0146072 A1* | 6/2010 | Friedman et al. ............. 709/217 |
| 2010/0210240 A1* | 8/2010 | Mahaffey et al. ............. 455/411 |
| 2010/0274922 A1* | 10/2010 | Reavely ....................... 709/238 |
| 2011/0099619 A1* | 4/2011 | Jewell ............................ 726/11 |
| 2011/0225547 A1 | 9/2011 | Fong et al. |
| 2011/0276619 A1* | 11/2011 | Khan ................... H04L 67/141 709/203 |
| 2012/0246479 A1* | 9/2012 | Sutherland et al. ........... 713/168 |
| 2013/0326596 A1* | 12/2013 | Hohlfeld et al. ................. 726/5 |

OTHER PUBLICATIONS

Slivka, Eric, et al., "Apple Researching Methods of Simplified Content Transfer between Devices", Retrieved at <<http://www.macrumors.com/2009/11/05/apple-researching-methods-of-simplified-content-transfer-between-devices/>>, Nov. 5, 2009, pp. 5.

International Search Report, mailing date Jan. 17, 2013, in Int'l Appl. No. PCT/US2012/041795, filed Jun. 10, 2012.

International Preliminary Examination Report, mailing date Dec. 17, 2013, in Int'l Appl. No. PCT/US2012/041795, filed Jun. 10, 2012.

* cited by examiner

REMOTELY RETRIEVING INFORMATION FROM CONSUMER DEVICES

BACKGROUND

It is common for a person to store a significant amount of personal information, whether photos, word processing documents, spreadsheets, presentations, video, or the like, on a home computer. It is desirable to be able to access this information through a mobile device, such as a laptop computer or mobile phone, or through another computer at another location, such as a computer at a place of employment, or a publicly accessible computer.

Instead of storing such information on a home computer, a person may use a service which allows a person to store information on network-accessible storage. Typically, a user accesses a server using a browser application running on a client computer. After authentication, such as logging into an account, the user uploads and stores information on the server. Because the server can be accessed through the network from any computer with a browser application, the user can access and download the information they stored on the server through any other computer connected to the network.

When information is stored remotely on the server, there can be performance problems. For example, an individual in one geographic location, e.g., Europe or Asia, likely would find performance to be slow if the servers were in another distant geographical location, e.g., North America.

Some users are not comfortable with storing information on a server that is owned and controlled by someone else. Instead, they would prefer to access their own computers remotely. Some systems, called remote desktop systems, provide this kind of access by installing an application on the computer to be remotely accessed. The application allows a desktop view of a host computer to be manipulated from a client computer that is connected to the host computer through a TCP/IP network. In particular, the host computer continually contacts the server to see if remote access is being requested. When a user wants to connect to the host computer from a client computer, the user runs an application on the client computer that contacts the server. The server in turn connects the client with the host computer. After this connection, the client can transmit keyboard and other commands to the host computer, and the host computer returns screen updates to the client computer. In essence, the client computer provides inputs to the host computer, and the host computer returns screen updates to the client computer.

Running applications remotely and remotely controlling another machine provides slow performance. In addition, as with a storage server, an individual in one geographic location, e.g., Europe or Asia, likely would find performance to be slow if the servers were in another distant geographical location, e.g., North America.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Users that access their personal information from a home computer or other user device typically only need access to data, and do not need to remotely control the desktops of their home computers or other user device. By providing a remote access service that coordinates access to the user device, a remote device can send commands to a user device to request various operations to be performed. An application on the host computer processes these commands, and provides the requested information back to the remote device.

Example commands include, but are not limited to, retrieving one or more files, retrieving file system directory information, packaging information and returning a result, directing the computer to upload information to a service, listing one or more device profiles, and remotely executing an operation and returning a result The commands also can be accompanied by parameters. Example parameters include, but are not limited to, type and format of data that the remote device expects, a type of the remote device, connection type, connection bandwidth, and the application on the remote device that will consume the received information. The user device can format the information being sent to the remote device based on the received parameters.

The connection between the remote device and the user device can be pinned to a server on both sides. The remote device connects to the server using a long standing request. The user device also connects to the server by issuing requests. The server provides the request from the remote device as a response to the request from the user device. When the server receives the data from the user device, it provides it to the remote device by responding to the request from the remote device.

Accordingly, in one aspect, a computing device is configured to allow a remote device to request commands to be performed on the computing device through a remote access service. A connection manager has a network connection to receive requests for connections from the remote access service, The connection manager is configured to, in response to a request from the remote access service for a connection, connect to a server in the remote access service by issuing a sequence of requests to the server. The connection manager further is configured to receive commands from the remote device through responses from the server to the requests. A data transfer module has an input for receiving the commands, and is configured to cause the commands to be performed on the computing device. This module has an output for providing data resulting from the commands to the connection manager. The connection manager further is configured to receive the data resulting from the commands and to send the data to the remote device by sending a message containing the data to the server.

In another aspect, a remote access service allows a remote device to request commands to be performed on a computing device. The remote access service includes a load balancer connected to a computer network and configured to receive, from the remote device, requests to access the computing device. It also includes a plurality of servers. The load balancer selects one of the plurality of servers for communication with the remote device and the computing device in response to a request from the remote device. The selected server is configured to receive requests for commands from the remote device, and cause the computing device to be notified of the request for access by the remote device. The selected server receives requests from the computing device for the commands from the remote device. The server then responds to the request from the computing device with the commands from the remote device. The server receives results from the commands from the computing device and forwards the received results to the remote device.

In another aspect, a system provides access to information by a remote device. The system includes a computing device on which information is stored and a remote access service including a plurality of servers. Each server is configured to receive requests for commands from the remote device, and cause the computing device to be notified of the request for access by the remote device. The server receives requests from the computing device for the commands from the remote device, and responds to the request from the computing device with the commands from the remote device. The server receives results from the commands from the computing device and forwards the received results to the remote device.

These various aspects can be embodied in a computer-implemented process, an article of manufacture including a computer storage medium having computer program instructions stored thereon, or as a computing machine.

In the following description, reference is made to the accompanying drawings which form a part hereof, and in which are shown, by way of illustration, specific example implementations of this technique. It is understood that other embodiments may be utilized and structural changes may be made without departing from the scope of the disclosure.

DETAILED DESCRIPTION

The following section provides an example operating environment in which a remote file access service can be implemented.

Figure 1:
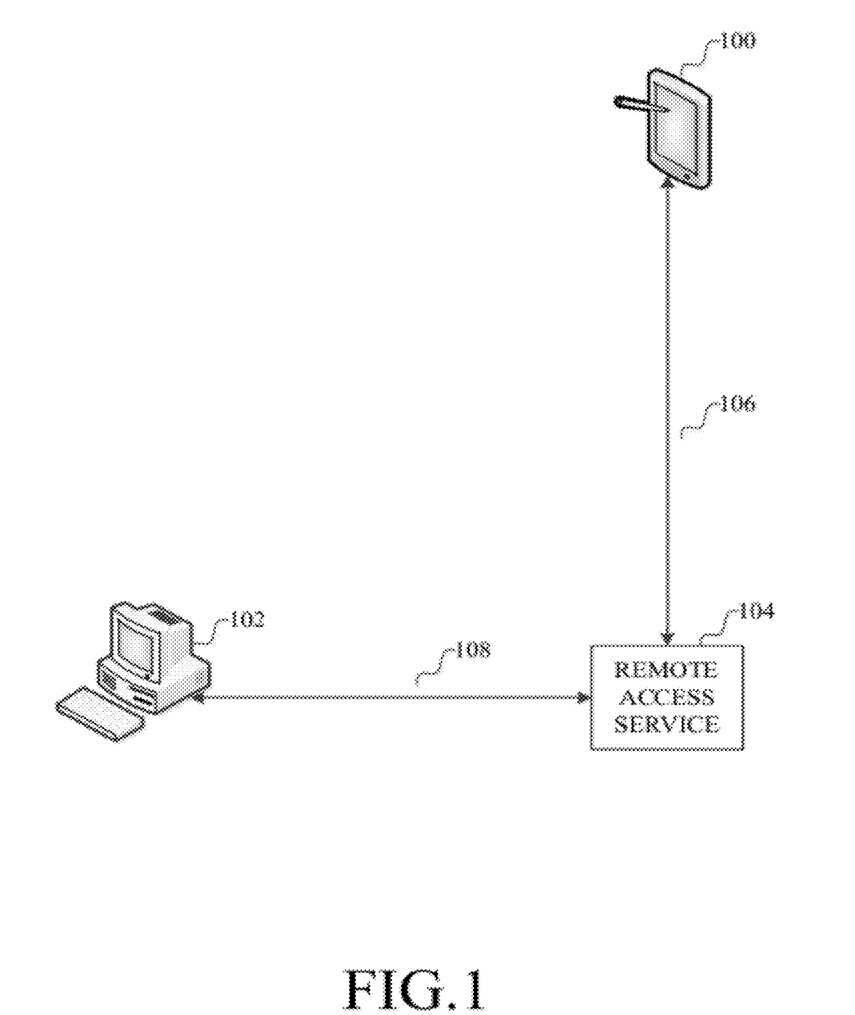
FIG. 1 is a block diagram of an example operating environment in which a remote file access service can be implemented.

Referring to FIG. 1, a remote device 100 can connect to one or more user devices 102 through a remote access service 104. The remote device 100 connects to the remote access service 104 over a computer network 106, typically an internet protocol (IP) based computer network. For example, the remote device 100 and remote access service 104 can communicate over an IP network. An example communication protocol that can be used is the Hypertext Transfer Protocol Secure (HTTPS), which is a combination of the Hypertext Transfer Protocol (HTTP) with the Secure Sockets Layer or Transport Layer Security (SSL/TLS) protocol to provide encrypted communication and secure identification of a network web server. Other protocols can be used and the invention is not limited to using a specific communication protocol. Similarly, a user device 102 connects to the remote access service 104 over a computer network 108, such as an internet protocol (IP) based computer network. While shown in FIG. 1 as separate networks, computer networks 108 and 106 can both be the internet and are not necessarily separate and distinct computer networks.

Example remote devices 100 include, but are not limited to, a mobile phone, a laptop computer, a desktop computer, a handheld computer or other computing device capable of connecting with and communicating with the remote access service 104 over the computer network 106. A remote device can be, for example, a mobile device carried by the user, or a computer at a place of employment, or a publicly accessible computer.

Example user devices 102 include, but are not limited to, a mobile phone, a laptop computer, a desktop computer, a handheld computer or other computing device capable of connecting with and communicating with the remote access service 104 over the computer network 108. A user device can be found, for example, in the user's home.

The remote access service 104 includes one or more server computers (not shown) that connect user devices and remote devices. The server computer to which a user device is connected generally is the server computer that is geographically closest to the user device within the remote access service 104.

In a manner to be described in more detail below, the system generally operates in the following way. A user instructs the user device 102 to connect to the remote access service 104. When the user is using the remote device 100, the user instructs the remote device 100 to connect to the remote access service 104. In response to user identifying information, the remote access service 104 identifies the user devices 102 that are associated with the user by the remote access service 104. The remote access service also identifies which of these user devices 102 are connected to the remote access service 104. The remote access service 104 provides information to the remote device 100 about the user devices 102 that are available, and allows the remote device 100 to issue commands, with parameters, to user devices 102.

Example commands include, but are not limited to, retrieving one or more files, retrieving file system directory information, packaging information and returning a result, directing the computer to upload information to a service, listing one or more device profiles, and remotely executing an operation and returning a result.

The commands also can be accompanied by parameters. Example parameters include, but are not limited to, type and format of data that the remote device expects, a type of the remote device, connection type, connection bandwidth, and the application on the remote device that will consume the received information. The user device can format the information being sent to the remote device based on the received parameters.

Given this context, an example implementation of the remote access service 104 will be described in more detail in connection with FIGS. 2-3.

Figure 2:
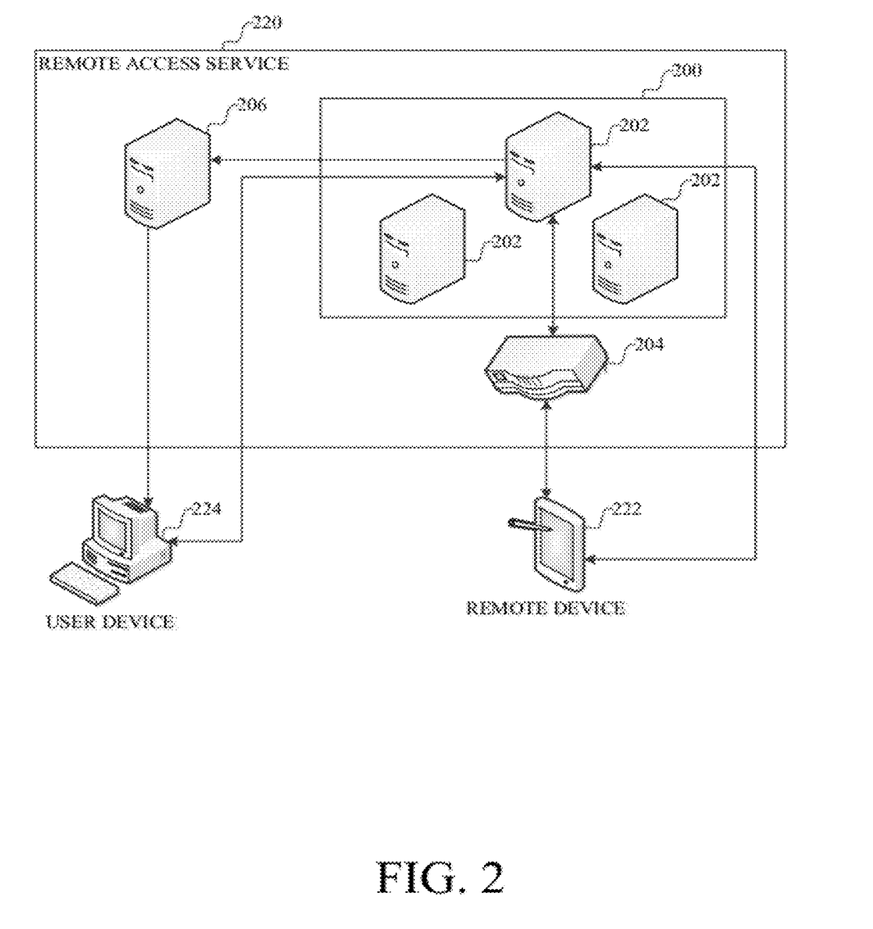
FIG. 2 is a more detailed block diagram of an example remote access service.

In FIG. 2, the remote access service 220 includes a server pool 200 which includes two or more server computers 202. A load balancer 204 is connected to each of the server computers 202. The load balancer can have an identifier, for example, a uniform resource locator (URL), in the form of [remote access service name].[domain name].[top level domain], that is used by the remote device to access the remote access service 220. The load balancer 204 maintains information about the loads and geographic locations of the server computers 202. In response to a request from a remote device, the load balancer selects one of the server computers 202 for managing the connection between the remote device 222 and the user device 224 to be accessed. If information about the geographical location of the server computer and at least one of the devices is available, then this selection can be based on the geographical proximity of the user device, remote device and server computer. The selected server computer sends its identifier to the remote device 222, for example a URL such as [server name].[remote access service name].[domain name].[top level domain]. The server computer 202 connects to a notification service 206, which attempts to authenticate the user and the remote device 222 with the user device 224. The notification service 206 informs the user device 224 that the remote device 222 is attempting to connect, and provides information enabling the user device 224 to connect to the selected server computer 202.

Figure 3:
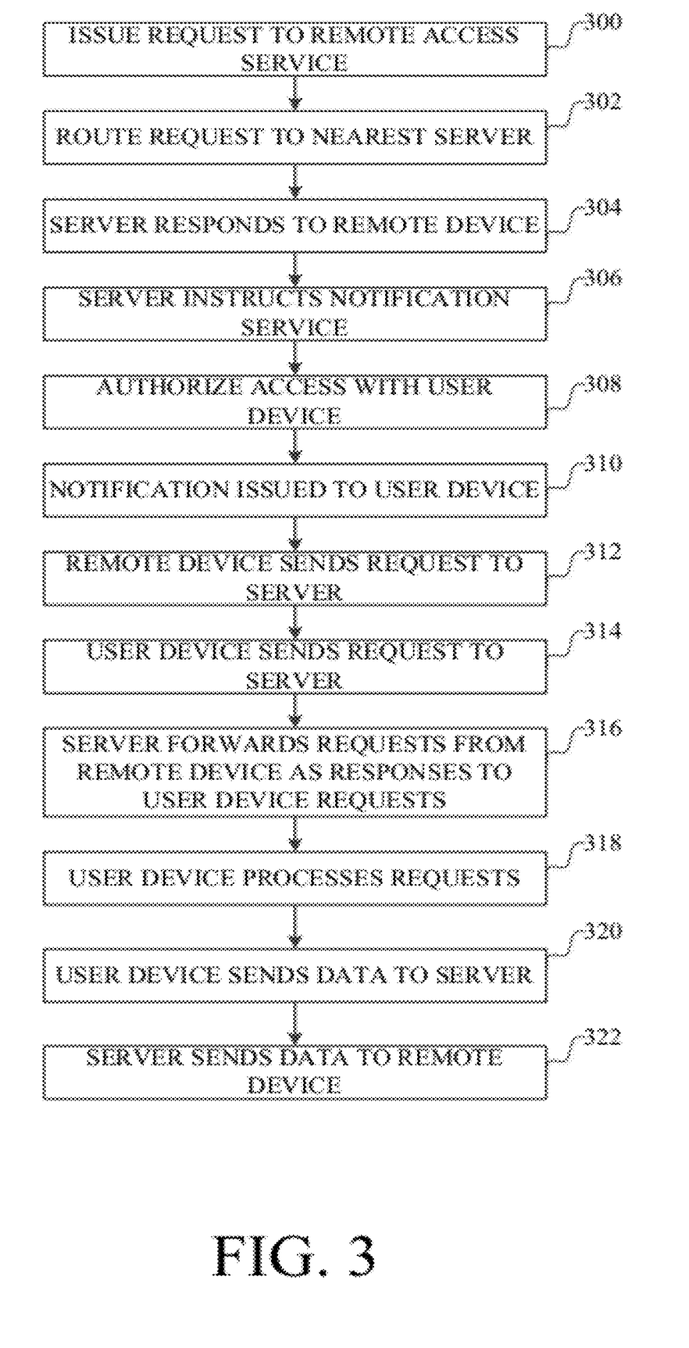
FIG. 3 is a flow chart describing an example operation of the system in FIG. 2.

The process performed by the system in FIG. 2 is shown in the flowchart of FIG. 3. The process of accessing a user device begins with a remote device issuing 300 a request to the remote access service, and in particular the load balancer 204. For example, the request can be an HTTPS message that includes the URL of the load balancer 204. If the request is for a specific device, the URL also could include a parameter that specifies the user device to be accessed. For example, a URL could be https://ra.live.com?did=<deviceid>, and the message sent could be a GET request in HTTPS. The load balancer 204 routes 302 the request to the nearest server computer in the server pool by selecting a server and passing the received request to it.

The selected server computer responds 304 to the original request from the remote device with a message to the remote device indicating the server computer to which the remote device should continue to contact to access data. For example, the message may include a URL of the form https://[servername].ra.live.com/vo.1/provider?rsid=<blob>, where [servername] is the name of the selected server. Instead of waiting for an acknowledgement, if the remote device does not respond within a set amount of time, e.g., two minutes, the connection can be terminated.

The server computer 202 also instructs 306 the notification service 206. The notification service 206 attempts to authorize 308 the user of the remote device for access to the user device, and issues 310 a notification to the user device about the request from the remote device.

After receiving information about the selected server, the remote device can then start to issue 312 messages to the server, e.g., GET requests in HTTPS, to perform various commands on the user device. The commands, and the parameters for these commands, can be appended to the URL received from the server.

In the meantime, the user device begins issuing 314 requests to the server, e.g., GET requests in HTTPS, to fetch the requests from the server that are being received by the server from the remote device.

In response to the requests from the user device, the server forwards 316 to the user device any messages that it has queued from the remote device. In response to a message from the server, the user device processes 318 the message and sends 320 any corresponding data to the server. The server sends 322 the data to the remote device and continues both receiving and sending both requests and data over the connections with the remote device and the user device.

Having now described the general operation of such the remote access service, an example implementation of the user device will now be described in connection with FIG. 4. In this implementation, the user device is connected to the computer network and has an application that is running that responds to the notifications from a notification service, such as described above in connection with FIGS. 2-3.

Figure 4:
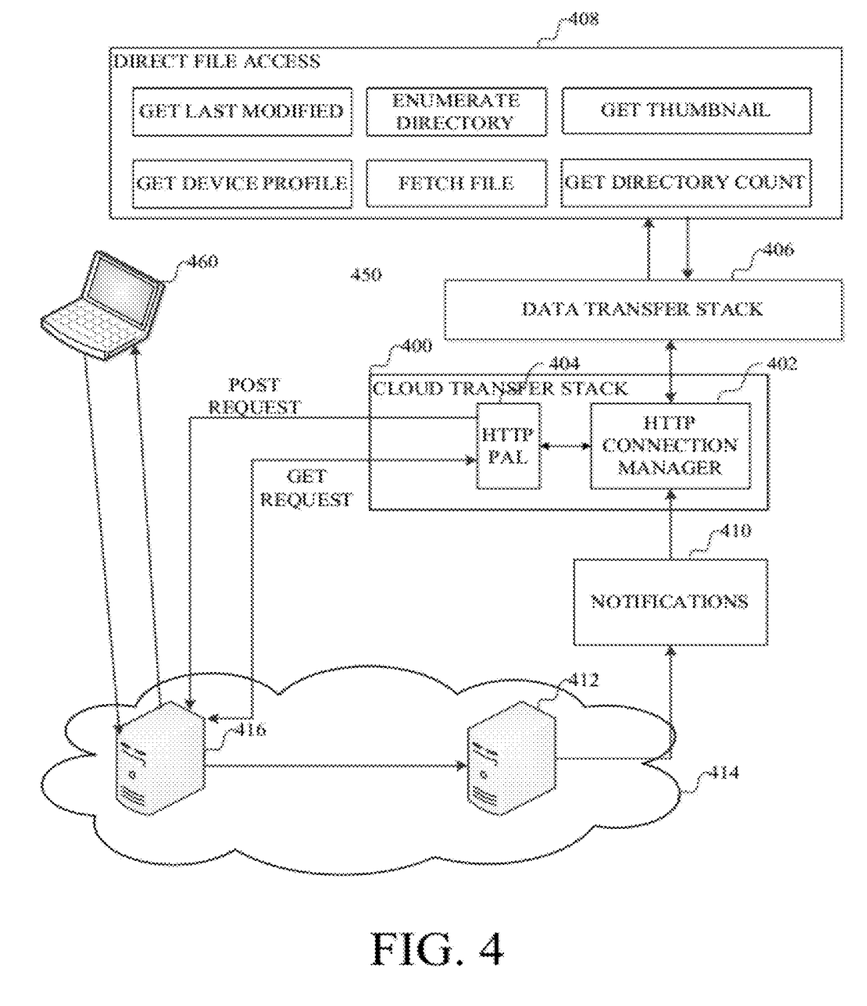
FIG. 4 is a more detailed block diagram of an example operation user device.

In FIG. 4, the user device 450 has a cloud transfer stack 400, which may be implemented as a dynamically linked library, which receives notifications 410 from the notification service 412 of the remote access service 414. The notifications are processed by a connection manager 402 to authenticate the user and the remote device 460. After authentication, the connection manager 402 connects to the server 416, through an (optional) HTTP platform abstraction layer (PAL) 404, and communicates with the server by posting data to the server and receiving requests for file system operations. The abstraction layer 404 provides a platform independent implementation of HTTP. The cloud transfer stack 400 sends periodic get messages to the server 416 to retrieve requests from the remote device 460. Each received request has a corresponding request identifier and session identifier.

The cloud transfer stack 400 also communicates with a data transfer stack 406, which handles access to and data transfer between a file access module 408 and the cloud transfer stack 400. For each request received from the remote device, the cloud transfer stack 400 initiates a command to the file access module 408 through the data transfer stack 406. The data transfer stack 406 queues requests and manages sending the requested commands to the file access module, causing the commands to be performed the data resulting from those commands to be formatted. When the data transfer stack 400 has received the data for a specified command in a request, it informs the cloud transfer stack, which in turn transfers the data to the server.

The file access module 408 responds to a variety of named commands, any of which can be specified in the request made by the remote device, along with parameters for the command. In FIG. 4, the example commands are fetch a file, get a thumbnail, get a directory count, enumerate the directory, get a device profile and get the last modified file. These operations are merely examples, and the invention is not limited to any specific set of file operations that can be performed. The data transfer stack 406 can be implemented to provide handlers for each of these commands. The handler for a command issues the command to retrieve data or other information and then formats the data according to the parameters received for the remote device. As an example, a command called "album view" could retrieve a set of images. If the remote device indicated that it can handle compressed data file packages, such as a *.zip file, then the handler for the "album view" command receives the image files and generates a *.zip file from them.

Figure 5:
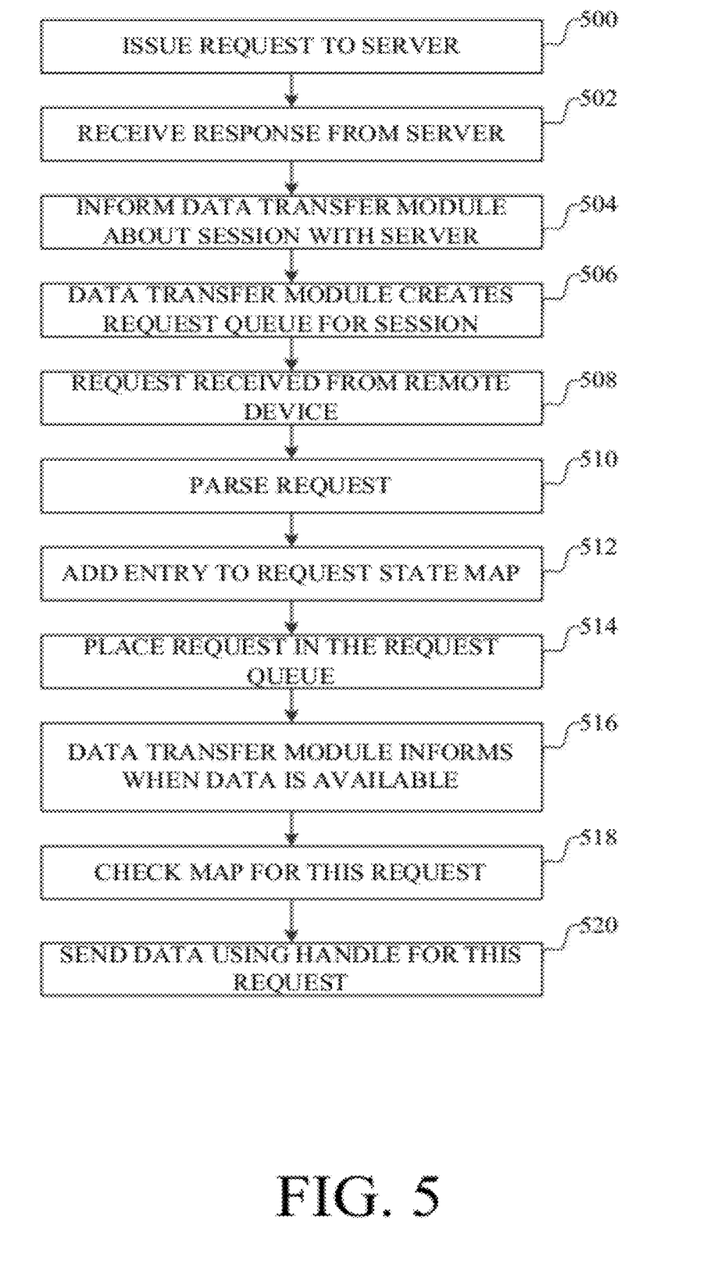
FIG. 5 a flow chart describing an example operation of the system in FIG. 4.

Referring now to FIG. 5, a flowchart describing the operation of the implementation of FIG. 4 will now be described in more detail.

The connection manager, after authentication, issues 500 a request to the selected server, such as an HTTPS GET message. A timeout of about two minutes can be used for a response. After a response is received 502, the connection manager informs 504 the data transfer stack that a session has been established between the user device and the server. For this session, the data transfer stack establishes 506 a request queue.

The connection between the remote device and the user device is thus pinned to a server on both sides. The remote device connects to the server using a long standing request. The user device also connects to the server by issuing requests. The server provides the request from the remote device as a response to the request from the user device. When the server receives the data from the user device, it provides it to the remote device by responding to the request from the remote device.

When a request is received by the user device from the remote device in response to the connection manager's request, the request is parsed 510 to obtain a request identifier and other information about the request, such as the operation to be performed and the URI for the server to which data will be posted by the connection manager. The connection manager maintains a request state map to track the status of requests. An entry is added 512 to this request state map with the request identifier. The connection manager queues 514 the request in the data transfer stack.

In some cases, the data to be sent to the server is sent using multiple messages. In some cases, only one message is used. To handle this complexity, when the data transfer stack retrieves the requested data it informs 516 the connection manager, using the request identifier. The connection manager checks 518 the request state map for an existing HTTP request handle for the request identifier, and creates one if one does not already exist. The handle is used to send 520 this data and any subsequent data from the data transfer stack for the same request identifier. When the data transfer stack informs 516 the connection manager of data being available, it also can provide an end flag, which indicates whether the data it is providing is the last portion of the data to be transferred for that request identifier.

With the foregoing system, a user can efficiently access personal information from a home computer or other user device without the need to remotely control its desktop. By providing a remote access server that coordinates access to the file system of the user device, a remote device sends commands to the user device. An application on the user device processes these commands, and in response, provides information to the remote device.

Having now described an example implementation, a computing environment in which such a system is designed to operate will now be described. The following description is intended to provide a brief, general description of a suitable computing environment in which the remote device, computers in the remote access service, and user devices, can be implemented. The system can be implemented with numerous general purpose or special purpose computing hardware configurations. Examples of well known computing devices that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, game consoles, programmable consumer electronics, network PCs, minicomputers, mainframe computers, distributed computing environments that include any of the above systems or devices, and the like.

Figure 6:
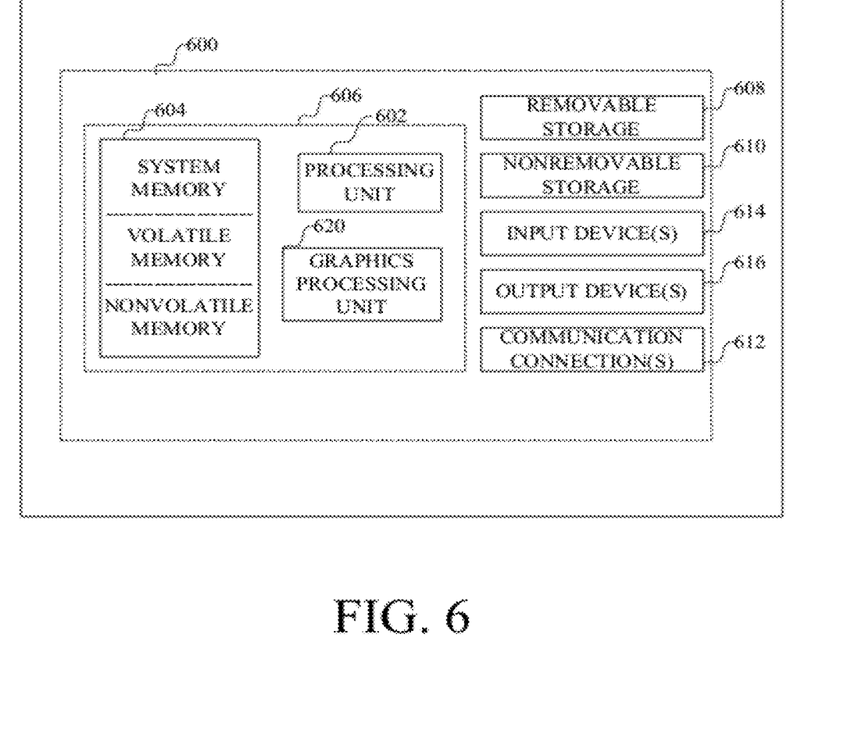
FIG. 6 is a block diagram of an example computing device in which such a system can be implemented.

FIG. 6 illustrates an example of a suitable computing system environment. The computing system environment is only one example of a suitable computing environment and is not intended to suggest any limitation as to the scope of use or functionality of such a computing environment. Neither should the computing environment be interpreted as having any dependency or requirement relating to any one or combination of components illustrated in the example operating environment.

With reference to FIG. 6, an example computing environment includes a computing machine, such as computing machine 600. In its most basic configuration, computing machine 600 typically includes at least one processing unit 602 and memory 604. The computing device may include multiple processing units and/or additional co-processing units such as graphics processing unit 620. Depending on the exact configuration and type of computing device, memory 604 may be volatile (such as RAM), non-volatile (such as ROM, flash memory, etc.) or some combination of the two. This most basic configuration is illustrated in FIG. 6 by dashed line 606. Additionally, computing machine 600 may also have additional features/functionality. For example, computing machine 600 may also include additional storage (removable and/or non-removable) including, but not limited to, magnetic or optical disks or tape. Such additional storage is illustrated in FIG. 6 by removable storage 608 and non-removable storage 610. Computer storage media includes volatile and nonvolatile, removable and non-removable media implemented in any method or technology for storage of information such as computer program instructions, data structures, program modules or other data. Memory 604, removable storage 608 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing machine 600. Any such computer storage media may be part of computing machine 600.

Computing machine 600 may also contain communications connection(s) 612 that allow the device to communicate with other devices. Communications connection(s) 612 is an example of communication media. Communication media typically carries computer program instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media.

Computing machine 600 may have various input device(s) 614 such as a display, a keyboard, mouse, pen, camera, touch input device, and so on. Output device(s) 616 such as speakers, a printer, and so on may also be included. All of these devices are well known in the art and need not be discussed at length here.

The system may be implemented in the general context of software, including computer-executable instructions and/or computer-interpreted instructions, such as program modules, being processed by a computing machine. Generally, program modules include routines, programs, objects, components, data structures, and so on, that, when processed by a processing unit, instruct the processing unit to perform particular tasks or implement particular abstract data types. This system may be practiced in distributed computing environments where tasks are performed by remote processing devices that are linked through a communications network. In a distributed computing environment, program modules may be located in both local and remote computer storage media including memory storage devices.

The terms "article of manufacture", "process", "machine" and "composition of matter" in the preambles of the appended claims are intended to limit the claims to subject matter deemed to fall within the scope of patentable subject matter defined by the use of these terms in 35 U.S.C. §101.

Any or all of the aforementioned alternate embodiments described herein may be used in any combination desired to form additional hybrid embodiments. It should be understood that the subject matter defined in the appended claims is not necessarily limited to the specific implementations described above. The specific implementations described above are disclosed as examples only.

What is claimed is:

1. A computing device configured to allow a remote device to request commands for file system operations to be performed on a file system of the computing device through a remote access service, the computing device comprising:

memory storing computer-executable instructions,
a processing unit coupled to the memory, the computer-executable instructions executed by the processing unit to:
establish a network connection to receive requests for connections from the remote access service, and in response to a request from the remote access service for a connection, authenticate the remote device for access to the file system of the computing device and, after authentication of the remote device, establish a pinned connection with a server in the remote access service by issuing a sequence of requests to the server;
wherein a pinned connection has been established between the remote device and the server by the remote device sending a long standing request to the server including one or more commands for file system operations on the computing device;
receive the one or more commands for file system operations from the remote device, after authentication of the remote device, through responses from the server to the sequence of requests; and
establish an input for receiving the one or more commands, and cause the one or more commands to be performed to retrieve data from the file system of the computing device, and establish an output for providing the data from the file system resulting from the one or more commands;
receive the data resulting from the one or more commands and send the data from the file system to the remote device by sending a message containing the data to the server with which the remote device has established the pinned connection, the server in turn responding to the requests from the remote device with the data from the file system of the computing device to the remote device.

2. The computing device of claim 1, wherein the one or more commands include parameters identifying the remote device, and wherein the data resulting from the one or more commands includes one or more files, and wherein the computing device processes the one or more files into a file format suitable for the remote device according to the parameters included with the one or more commands.

3. The computing device of claim 1, wherein the one or more commands include instructions to enumerate a directory in a file system of the computing device.

4. The computing device of claim 1, wherein the one or more commands include instructions to retrieve a file in a file system of the computing device.

5. The computing device of claim 1, wherein the one or more commands include instructions to retrieve a collection of files in a file system of the computing device, and the computer-executable instructions executed by the processing unit collects and aggregates the files into a package to be sent to the remote device.

6. The computing device of claim 1, including a queue for requests for each session between the remote device and the computing device.

7. The computing device of claim 1, including a request state map for each request for managing information about communication between the remote device and the computing device related to the each request.

8. A remote access service for allowing a remote device to request commands for file system operations to be performed on a file system of a computing device, the remote access service comprising:
a load balancer connected to a computer network and configured to receive, from the remote device, requests to access the computing device;
a plurality of servers;
the load balancer selecting one of the plurality of servers for communication with the remote device and the computing device in response to a request to access the computing device from the remote device;
the selected server comprising memory storing computer-executable instructions and a processing unit coupled to the memory, the computer-executable instructions executed by the processing unit to:
establish a pinned connection between the remote device and the selected server by the remote device sending a long standing request to the selected server including one or more commands for file system operations on the computing device;
cause the computing device to be notified of the request to access the computing device from the remote device;
cause the computing device to perform authentication of the remote device for access to the file system of the computing device;
after authentication of the remote device by the computing device, establish a pinned connection between the selected server and the computing device; and
while the connections between the selected server and the computing device and between the remote device and the selected server are pinned:
receive requests for the one or more commands for file system operations to be performed on the computing device from the remote device;
receive requests from the computing device for the one or more commands from the remote device;
respond to the requests from the computing device with the one or more commands from the remote device;
receive results from the one or more commands from the computing device including data from the file system of the computing device; and
forward the received data from the file system of the computing device to the remote device in a response to the requests from the remote device.

9. The remote access service of claim 8, wherein the load balancer selects the server according to geographic proximity of the server with the remote device and the computing device.

10. The remote access service of claim 8, further comprising a notification service, wherein the selected server instructs the notification service to inform the computing device about the request to access the computing device from the remote device.

11. The remote access service of claim 8, wherein the one or more commands include parameters identifying the remote device, and wherein data resulting from the one or more commands includes one or more files, and wherein the computing device processes the one or more files into a file format suitable for the remote device according to the parameters included with the one or more commands.

12. The remote access service of claim 8, wherein the one or more commands include instructions to enumerate a directory in a file system of the computing device.

13. The remote access service of claim 8, wherein the one or more commands include instructions to retrieve a file in a file system of the computing device.

14. The remote access service of claim 8, wherein the one or more commands include instructions to retrieve a collection of files in a file system of the computing device, and in response to the one or more commands, the remote access service receives a package of aggregated files from the computing device and sends the package of aggregated files to the remote device.

15. A system providing access to information in a file system of a computing device by a remote device, the system comprising:
- the computing device including storage, wherein the information in the file system is stored in data files on the storage;
- a remote access service to which the computing device is connected over a computer network, the remote access service comprising a plurality of servers,
- wherein a selected server of the plurality of servers is configured to:
- establish a pinned connection between the remote device and the selected server in response to the remote device sending a long standing request to access to the computing device using the selected server, the long standing request including one or more commands for file system operations on the computing device;
- cause the computing device to be notified of a request for access by the remote device;
- cause the computing device to perform authentication of the remote device for access to the file system of the computing device;
- after authentication of the remote device by the computing device, establish a pinned connection between the selected server and the computing device; and
- while the connections between the selected server and the computing device and between the remote device and the selected server are pinned:
  - receive requests for the one or more commands for file system operations to be performed on the computing device from the remote device;
  - receive requests from the computing device for the one or more commands from the remote device;
  - respond to the requests from the computing device with the one or more commands from the remote device;
  - receive results from the one or more commands from the computing device including data from the file system of the computing device; and
  - forward the received data from the file system of the computing device to the remote device in a response to the requests from the remote device.

16. The system of claim 15 wherein the computing device comprises:
- memory storing computer-executable instructions,
- a processing unit coupled to the memory, the computer-executable instructions executed by the processing unit to:
- establish a network connection to receive requests for access by the remote device from servers of the remote access service, and in response to a request for access from the selected server from among the plurality of servers of the remote access service, connect to the selected server by issuing a sequence of requests to the selected server;
- receive the one or more commands from the remote device through responses from the selected server to the sequence of requests; and
- establish an input for receiving the one or more commands, and cause the one or more commands to be performed on the computing device, and establish an output for providing data resulting from the one or more commands;
- receive the data resulting from the one or more commands and send the data to the remote device by sending a message containing the data to the selected server.

17. The system of claim 16, wherein the one or more commands include parameters identifying the remote device and wherein the computer-executable instructions executed by the processing unit processes the data resulting from the one or more commands into a format suitable for the remote device.

18. The system of claim 16, wherein the one or more commands include instructions to enumerate a directory in a file system of the computing device.

19. The system of claim 16, wherein the one or more commands include instructions to retrieve a file in a file system of the computing device.

20. The system of claim 16, wherein the one or more commands include instructions to retrieve a collection of files in a file system of the computing device, and the computer-executable instructions executed by the processing unit collects and aggregates the files into a package to be sent to the remote device.

21. The system of claim 15, wherein the plurality of servers includes a notification server configured by a notification service application to notify the computing device about the request for access from the remote device, and wherein the computing device is configured to subscribe to the notification service application to accept notifications from the notification server.

22. The system of claim 15, wherein the selected server is further configured to: queue the received requests for the one or more commands in a queue at the selected server;
- in responding to the requests from the computing device, accessing the one or more commands from the remote device from the queue.

23. The system of claim 16, wherein the computing device includes a queue for requests for each session between the remote device and the computing device.

24. The system of claim 23, wherein the computer-executable instructions executed by the processing unit configures the computing device to, in response to receiving a command, add each of the requests to the queue and add an entry for each of the request to a request state map.

* * * * *